United States Patent Office 3,369,640
Patented Feb. 20, 1968

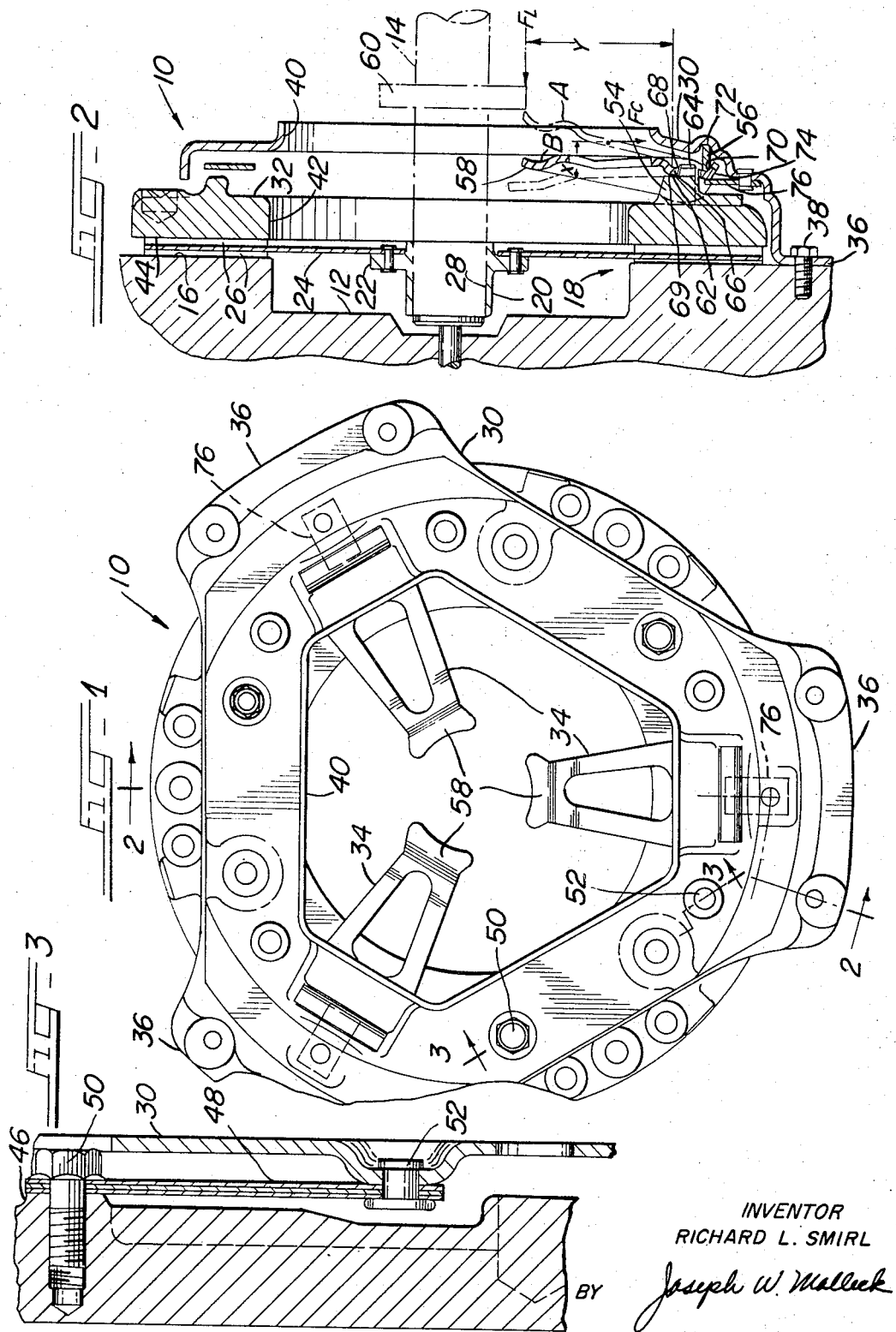
INVENTOR
RICHARD L. SMIRL
BY Joseph W. Malleck
ATTY

3,369,640
DEVICE TO PREVENT CENTRIFUGAL
CLUTCH ENGAGEMENT
Richard L. Smirl, La Grange Park, Ill., assignor to Borg-Warner Corporation, Chicago, Ill., a corporation of Illinois
Filed Jan. 3, 1966, Ser. No. 518,436
4 Claims. (Cl. 192—99)

ABSTRACT OF THE DISCLOSURE

A clutch assembly adapted to restrain the clutch actuating levers against undesirable movement resulting from the centrifugal force acting on such levers at high rotational speed.

---

The present invention relates to clutches and more particularly to friction clutches such as those installed in motor vehicles.

In lever-operated type clutches such as is disclosed in U.S. Patent to Smirl and Cook No. 3,167,163 issued Jan. 26, 1965 one of the problems that has been encountered is that there is a limit to the rotational speeds at which these clutches may be operated. This is due in part at least to the centrifugal forces which are exerted on the levers which are actuated to control the axial movement of the pressure plate. In a structure of the type disclosed in the above-mentioned patent, for example, when the clutch is in a disengaged position the levers are subjected to a centrifugal force which increases, of course, as the speed of the unit increases. Since the axial position of the inner end of the operating levers is controlled by the position of the thrust element, which actuates the levers, increases in centrifugal force tend to move the whole levers radially outwardly. When this happens an axial component of the centrifugal force is developed which tends to urge the pressure plate with which the levers are associated into a clutch engaging position.

It is an object of this invention, therefore, to provide means to counteract the centrifugal forces acting on the clutch actuating levers at high speeds to prevent undesirable clutch engagements at those high speeds.

Another object is to provide means to counteract the centrifugal forces acting on the clutch actuating levers to permit the clutch to operate at speeds which would otherwise be unattainable.

Another and more specific object of the invention is to provide lever restraining means associated with the clutch cover plate which will exert a force against the lever ends to prevent the levers from exerting undesirable forces on the pressure plate with which they are associated.

A further object is to provide actuating lever restraining means which may exert a force on the actuating levers which when combined with the forces exerted by the pressure plate retractor straps will effectively resist undesired axial movement of the clutch actuating levers.

The above and other objects and advantages of the invention will be more readily apparent when read in connection with the accompanying drawings in which:

FIGURE 1 is a plan view of a clutch unit embodying the invention showing a clutch cover plate and clutch operating levers;

FIGURE 2 is sectional view taken along line 2—2 of FIGURE 1 showing a clutch cover plate, a pressure plate and a clutch operating lever positioned between the cover plate and pressure plate;

FIGURE 3 is a fragmentary view partially in section taken along the line 3—3 of FIGURE 1.

Referring now to the drawings wherein like reference characters in the different figures designate the same parts, 10 designates generally a clutch unit for interconnecting a driving and driven member.

FIGURE 2 illustrates a rotatable flywheel 12 which is part of the driving member and is drivingly connected to a prime mover such as an internal combustion engine (not shown). Also shown in FIGURE 2 is a driven member in the form of a driven shaft 14. The clutch unit is interposed between the driving and driven member to transmit a drive from the driving member to the driven member.

The flywheel has formed thereon a radially extending flat face 16 which defines a clutching surface.

The driven shaft 14 is disposed coaxially with respect to the flywheel 12.

A friction disc assembly 18 is slidably mounted on the driven shaft 14. The friction disc assembly 18 comprises a hub portion 20, having a radially extending flange 22 to which is secured a flexible element 24 a plurality of which can be employed carrying suitable friction discs 26 at the outer periphery thereof which are made of a suitable friction material. The hub 20 has a central opening 28 on which are formed a plurality of splines for mounting on the shaft 14 and securing the hub against rotation with respect to the driven shaft 14. The left end of the shaft 14 may be journalled in the flywheel 12 in a suitable manner.

The clutch unit 10 comprises a cover plate 30, a pressure plate 32 and a plurality of clutch operating levers 34 positioned between the cover plate and the pressure plate. The cover plate as illustrated comprises a generally triangular dish shaped member which may be made by stamping from relatively heavy sheet metal. At the outer periphery of the cover plate there are formed a plurality of radially extending flanges 36 through which bolts 38 may extend to secure the cover plate 30 to the flywheel 12. A large central opening 40 is formed in the cover plate 30 through which the driven shaft 14 extends.

The pressure plate 32 comprises a relatively heavy annular ring member having an opening 42 at the center thereof through which the driven shaft 14 extends. A radially extending flat face surface 44 which defines a clutching surface, is formed on the side of the pressure plate toward the friction element. On the opposite side of the pressure plate there are formed a plurality of bosses 46 (see FIGURE 3) to which one end of flexible retractor strap members 48 are attached by suitable means such as bolts 50. The other end of the strap members 48 are attached to the cover plate 30 by suitable means such as rivets 52. The strap members 48 are for the purpose of urging the pressure plate 32 to a position out of engagement with the friction discs 26. It is contemplated that the construction of these flexible strap members 48 may be the same as and that they may function in the same manner as the strap members described in the above mentioned U.S. Patent 3,167,163 to Smirl et al.

A plurality of axially extending actuating lugs 54 are formed on the pressure plate 32 on the side of the pressure plate opposite the clutching surface 44.

In order to actuate the clutch mechanism there are provided a plurality of circumferentially spaced actuating levers 34 shown here as being three in number. These levers 34 are fulcrumed on the cover plate 30 and can be pivoted to exert a force on the pressure plate 32 to urge the clutch into engagement so that the friction discs are in driving engagement with the clutching surface 44 of the pressure plate 32. The lever arrangement disclosed herein and the manner in which it is positioned with relation to the pressure plate and the cover plate is substantially the same as that disclosed in the above referred to U.S. Patent 3,167,163 to Smirl et al.

The levers 34 extend in a generally radial direction. Each is pivoted or fulcrumed on the cover plate 30 by means of a strut member 56. The inner ends 58 of the levers 34 are adapted to be actuated by a clutch bearing or lever actuating collar 60 actuatable by a load spring outside the clutch and not shown herein. The collar 60 is mounted on and is axially movable along the driven shaft 14.

Intermediate the ends of each lever 34 there is formed an opening 62 for receiving a nose portion 64 of the lug 54. The radially innermost edge 66 of the opening 62 rides on shoulder 68 of the nose portion 64. The shoulder 68 restrains the lever 34 against radially outward movement.

An intermediate portion 69 of the lever 34 adjacent the edge 66 is in rolling contact wtih a flat surface on the pressure plate.

The outer end of the lever 34 is formed with a recess 70 for receiving one end of the strut 56 and the cover plate 30 has formed therein a plurality of recesses 72 for receiving the other end of struts 56.

The lever 34 as illustrated in the full line position B in FIGURE 2 is in the clutch engaging position. The dotted line position A shows the position of the lever 34 in a clutch disengaged position.

When the flywheel is rotated at extremely high speeds with the clutch disengaged and the levers 34 in substantially the A position a great centrifugal force is put on the levers 34 tending to throw them radially outwardly. This centrifugal force acts through the center of mass of the levers with a force $F_c$. The clutch bearing 60, of course, restrains the lever ends 58 from moving to the right as viewed in FIGURE 2. Since the innermost edge 66 of the opening 62 rides on surface 68 of the nose portion 64 of the lever does not move directly radially outwardly. But there is an opportunity for an axial component of the centrifugal force $F_c$ to act to move the radially outermost portions 74 of the levers 34 to the left as viewed in FIGURE 2. This, of course, would move the pressure plate 32 to a clutch engaging position.

While it is true that the retractor strap members tend to urge the pressure plate 32 to the right, as viewed in FIGURE 2, to a disengaged position, there is a practical limit to the amount of force that may be provided by these straps consistent with the amount of force that is to be made available to actuate the levers 34 through the clutch bearing 60.

Accordingly other means must be provided to counteract the centrifugal forces at high speeds of the clutch unit which would tend to urge the pressure plate into clutch engaging position when that is not desired. This then is the important feature of this invention. We have provided restraining means to counteract the undesirable effects of the centrifugal forces acting on the actuating levers 34. We have attached to the cover plate 30 a flexible restraining member 76 in the form of a resilient thin metal member. It is attached to the cover plate by suitable means such as a rivet 78. A restraining member 76 is used in conjunction with each of levers 34 of the clutch mechanism. This is particularly important in high speed applications where the speeds may well exceed by 25% or more those normally encountered.

In FIGURE 2 the forces acting on the levers 34 when the clutch unit 10 is rotating are diagrammatically illustrated.

A fulcrum point is provided in the vicinity of the point of contact of the rolling surface 69 with the flat surface on the pressure plate. This fulcrum point shifts slightly with the axial movement of the pressure plate. $F_L$ represents the force acting on the innermost end 58 of lever 34 through a moment arm $y$ in a counterclockwise direction. $F_c$ represents the centrifugal force acting through the center of mass of the lever 34 in a clockwise direction through a moment arm $x$. Since the nose portion 64 prevents strict radial movement of the levers 34 an axial force component will be transmitted in an axial direction against the pressure plate 32 (to the left as viewed in FIGURE 2) tending to urge it into clutching engagement. The restraining member 76 acts against the end 74 of lever 34 to restrain the end 74 from moving to the left as viewed in FIGURE 2 i.e., it exerts a force opposite to the axial component of the centrifugal force acting on the lever 34.

The member 76 comprises a thin resilient metal member which may span a substantial part of the width of the end 74 of the lever 34. The member 76 may be initially positioned with respect to the lever 34 with a .005" clearance to a .005" preload against the lever to counteract the excess centrifugal forces tending to shift the lower end of the lever 34 axially to the left as viewed in FIGURE 2.

Tests have been performed to test the effectiveness of the restraining members 76. For example, in a clutch of the type described having friction discs of 11 inches in diameter tests were made on a clutch in the disengaged condition. These tests showed that reengagement of the clutch would occur due to centrifugal forces acting on the levers 34 at speeds between 7700 and 7800 r.p.m. Up to that point the retractor strap members 48 exert a sufficient force on the pressure plate 32 to hold it out of engagement.

In the same type of clutch device utilizing restrainer members tests were made at speeds as high as 9200 r.p.m. and no centrifugal reengagement occurred. Extrapolation of test results to 10,000 r.p.m. indicated that no such reengagement would occur up to this speed.

Thus it will be apparent that we have advantageously improved a clutch of type described to enable the clutch to be used in high speed applications. We have done this by the simple but effective means of providing an attachment which will restrain the clutch actuating levers against undesirable axial movement caused by excessive centrifugal forces at high speeds.

While a preferred embodiment of the invention has been specifically disclosed, it is to be understood that the invention is not limited thereto as other variations will be readily apparent to those skilled in the art and the invention is to be given its fullest possible interpretation within the terms of the following claims.

What is claimed is:

1. In a clutch assembly the combination comprising:
  a pressure plate adapted to urge a clutch into engagement;
  a cover plate connected to said pressure plate;
  a resilient means connecting said pressure plate and said cover plate for urging said pressure plate to a clutch disengaging position;
  clutch actuating lever means pivotally supported on said pressure plate and operatively associated with said cover plate for urging said pressure plate into a clutch engaging position; and
  restraining means separate from said resilient means forming a part of said cover plate effective to restrain said lever means against undesirable movement which, in turn, would urge said pressure plate to a clutch engaging position.

2. The combination of claim 1 wherein said restraining means comprises a resilient member associated with each actuating lever, said resilient member overlapping the radially outermost end of said lever to restrain the axial movement of said end of said lever.

3. A friction clutch assembly comprising:
  a rotatable driving member;
  a rotatable driven member;
  a cover plate attached to said driving member;
  an axially movable pressure plate connected to said cover plate for urging said driven member into clutching engagement with said driving member;
  resilient means connecting said pressure plate to said cover plate and effective to urge said pressure plate out of engagement with said driven member;

a plurality of clutch actuating levers pivotally supported on said cover plate and operatively associated with said pressure plate for urging said pressure plate to a clutch engaging position; and restraining means attached directly to said cover plate and operatively associated with said clutch actuating levers to counteract centrifugal forces acting on said levers at high speeds to prevent said levers from urging said pressure plate to a clutch engaging position.

4. An actuating assembly for use in a clutch device, comprising: a rotatable reaction element, a pressure element, a pressure element driven by said reaction element and normally biased in one direction, at least one radially directed lever interconnecting said pressure element and reaction element and having provision for being carried by said elements in a manner for pivotal movement to promote movement of said pressure element relative to said reaction element in a direction opposite to said bias, said lever having a rolling contact with a surface of said pressure element and having a swivel connection by way of a strut loosely bearing between said lever and reaction element, at least one end of said lever being normally unrestrained for pivotal movement in one pivotal direction and restrained only against pivotal movement in an opposite pivotal direction, and means connected directly to said reaction element for restraining said lever against nutation under influence of centrifugal forces at high rotative speeds of said reaction element tending to promote movement of said pressure element in said opposite direction relative to said bias while said end of said lever is restrained against pivotal movement in said opposite pivotal direction.

References Cited

UNITED STATES PATENTS

| | | | |
|---|---|---|---|
| 2,060,773 | 11/1936 | Pearmain | 192—99 X |
| 2,870,893 | 1/1959 | Palm | 192—68 X |
| 2,966,978 | 1/1961 | Kaptor. | |
| 3,167,163 | 1/1965 | Smirl et al. | 192—68 |
| 3,250,357 | 5/1966 | Zeidler. | |

FOREIGN PATENTS 796,785   6/1958   Great Britain.

BENJAMIN W. WYCHE III, *Primary Examiner.*